United States Patent [19]
Castrantas et al.

[11] Patent Number: 5,137,642
[45] Date of Patent: Aug. 11, 1992

[54] DETOXIFICATION OF AQUEOUS CYANIDE SOLUTIONS

[75] Inventors: Harry M. Castrantas, Newtown; Michael R. Fagan, Holland, both of Pa.

[73] Assignee: FMC Corporation, Philadelphia, Pa.

[21] Appl. No.: 823,400

[22] Filed: Jan. 21, 1992

[51] Int. Cl.⁵ .................................................. C02F 1/58
[52] U.S. Cl. ..................................... 210/759; 210/904
[58] Field of Search ............... 210/721, 748, 759, 758, 210/763, 904

[56] References Cited

U.S. PATENT DOCUMENTS

| | | | |
|---|---|---|---|
| 3,510,424 | 5/1970 | Zumbrunn | 210/63 |
| 3,617,567 | 11/1971 | Mathre | 210/904 |
| 4,070,281 | 1/1978 | Tagashira et al. | 210/904 |
| 4,417,987 | 11/1983 | Harrison | 210/904 |
| 4,419,246 | 12/1983 | Jayawant | 210/759 |
| 4,512,900 | 4/1985 | Macur et al. | 210/904 |
| 4,822,496 | 4/1989 | Griffiths et al. | 210/759 |
| 4,851,129 | 7/1989 | Griffiths et al. | 210/759 |
| 4,966,715 | 10/1990 | Ahsan et al. | 210/759 |
| 5,006,262 | 4/1991 | Weyls | 210/719 |

OTHER PUBLICATIONS

Randol International, Gold & Silver Recovery Innovations, Phase III, vol. 9, 2 Apr. 1987; p. 5209.
Martell et al.; *Chemistry of the Metal Chelate Compounds*, Prentice-Hall, NY 1912; pp. 540-543.
Kumar et al., "Determination of Stability Constants of Mixed Ligand Complexes by Kinetic Method: Part II," Ind. J. of Chem., vol. 8A, Sep. 1979; pp. 247-251.
Kumar et al., "Kinetics and Mechanism of Tetracyanonickelate Formation", J. of Phy. Chem., 82:18, pp. 1955-1961, 1978.
Kumar et al., "Kinetics and Mechanism of Tetracyanonickelate Formation", J. of Phy. Chem. 83:16; pp. 2090-2096, 1979.

*Primary Examiner*—Thomas Wyse
*Attorney, Agent, or Firm*—R. E. Elden; P. C. Baker; R. L. Andersen

[57] ABSTRACT

A process is provided for detoxifying an aqueous solution containing weak acid-dissociable cyanide metal complexes. The process comprises incorporating hydrogen peroxide and at least 1 mole of citric acid per mole of complexed metal ion and maintaining the pH of the solution between 8 and 12.

4 Claims, No Drawings

DETOXIFICATION OF AQUEOUS CYANIDE SOLUTIONS

The present invention relates to a process for detoxifying aqueous solutions containing cyanide and metals with a peroxygen. In particular, it relates to detoxifying solutions of metal cyanide complexes.

Purification of waste waters is of major importance for the protection of the environment. Effluents from many industries, including electroplating, steel-hardening and mining operations, often contain cyanide in various forms together with toxic metals. The detoxification of these waste waters is of paramount importance before such waste waters are discharged, in order to avoid serious damage to the environment and adverse impact on public health and safety.

A number of methods have been developed over the years for treating such effluents. One of the best of the known methods involves the oxidation of the cyanide contained in the waste water with hydrogen peroxide catalyzed by copper or silver. This process, which is taught in U.S. Pat. No. 3,617,567 is limited to solutions containing free cyanide ions or to those complex cyanides which dissociate in the aqueous solution to form free cyanide ions. The process replaced older methods involving chlorine which had the disadvantage of adding undesirable salts into the waste water. The use of hydrogen peroxide overcomes the disadvantages associated with methods which involve salt formation and the introduction of those salts into waste waters.

U.S. Pat. No. 4,070,281 discloses free cyanide ions in organic wastes can be oxidized in the presence of certain copper and ammonium salts. Sodium hypochlorite was the most effective oxidizing agent followed by potassium persulfate and ozone. The least effective oxidant was found to be hydrogen peroxide. The toxic copper must be removed from the effluent prior to discharge. Further, the process requires oxidizing the organic wastes at 170° C. to 300° C. at pressures of 20 to 150 kg/cm$^2$, making it impractical for large scale installations.

U.S. Pat. No. 4,417,987 teaches that nickel cyanide complexes can be oxidized with copper catalyzed hydrogen peroxide if an aminocarboxylic acid complexing agent (EDTA or NTA) with a stability constant of less than 9.5 is incorporated into the solution. The process is undesirable environmentally because it retains the metals in the effluent as metal complexes which are not readily biodegradable. The process of U.S. Pat. No. 4,419,246 would be necessary to overcome discharging into the environment chelated heavy metal ions from such a waste stream by a further step of oxidizing the chelant with hydrogen peroxide in the presence of magnesium ions and calcium hydroxide, thereby precipitating the heavy metals U.S. Pat. No. 4,851,129 teaches that removing magnetic metals from tailings, pulp or slurry prevents premature decomposition of hydrogen peroxide used to decompose the cyanides contained therein. On the other hand, U.S. Pat. No. 4,822,496 discloses that one species that is often difficult to oxidize is the tetracyanonickelate ion. The patent teaches employing trimercaptotriazine to precipitate metals (Cu, Ni and Fe) from the cyanide complexes prior to treatment with hydrogen peroxide to destroy the then-free cyanide ions.

However, such prior art processes consume too much hydrogen peroxide according to U.S. Pat. No. 4,966,715. Instead, the patent teaches mixing phosphoric acid with hydrogen peroxide to overcome the difficulties of prior processes. However, the process requires the added step of precipitating the added phosphate ions with ferric iron prior to discharging the effluent. One skilled in the art will readily recognize the precipitation of phosphate with ferric ion must be accurately and continuously controlled in order to avoid an excess of either the phosphate ion or the ferric ion in the effluent. This critical control makes the process unsuitable for continuous applications.

In addition to the difficulty of oxidizing the cyanide complex observed by the prior art, it has been found that the alkaline solutions of metal cyanide complexes contain decomposition complexes for hydrogen peroxide.

The present invention overcomes the problems of the prior art by providing a long-sought process for detoxifying an aqueous solution containing weak acid dissociable (WAD) cyanide complexes of metals, the process comprising incorporating hydrogen peroxide and citric acid or a soluble salt thereof into the aqueous solution and maintaining the aqueous solution between pH 8 and pH 12 for a sufficient time to oxidize at least part of the cyanide contained therein, the hydrogen peroxide being provided in an amount sufficient to maintain a concentration of at least 1 millimole per liter of the aqueous solution, and the citric acid being provided in an amount to complex substantially all of the metal in the WAD cyanide complexes.

The biodegradable citric acid chelant may be incorporated into the solution in any convenient form, such as solid citric acid, its hydrate or a solution of citric acid. On the other hand, it may be introduced as a suitable salt of citric acid, either as a solution or as a solid salt. The cation in the salt may be an alkali metal salt, such as sodium, potassium, or an alkaline earth salt, such as a magnesium or calcium salt.

The amount of hydrogen peroxide to be added will vary with the amount of cyanide to be destroyed and the decomposition rate of hydrogen peroxide in the solution. It is usually desirable to make successive additions of hydrogen peroxide to maintain a residual concentration of at least 1 millimole per liter.

At least about 1 mole to 2 moles of citrate ion should be added per mole of complexed metal ion in the solution. Adding more than 2 moles citrate ion per mole of complexed metal ion does not provide sufficient additional benefit to justify the added cost. About 1 mole of citrate ion is economically preferred.

Although the pH may vary over a wide range between 8 and 12, it is desirable for the pH to be maintained between about 9 and 10, preferably about pH 9.5.

The temperature is not critical, and usually ambient temperature is satisfactory. However, the rate of reaction decreases with a decreased temperature while the rate of decomposition of hydrogen peroxide increases with temperature. One skilled in the art can readily determine the optimum temperature for the particular WAD cyanide solution being treated. Generally a temperature of about 10° C. to about 40° C. may be employed.

The following examples are employed to illustrate the process to one skilled in the art, and not as a limitation.

EXAMPLES

The cyanide content of the solutions was determined spectrophotometrically using the standard picric acid method. Free cyanide and weak-acid dissociable cyanide are reacted with a picric acid reagent to produce an orange color which can be measured spectrophotometrically at 520 nm or can be estimated by eye. Standards were prepared for comparison purposes. The lower limit of detection is 0.26 mg/l cyanide.

EXAMPLE 1

Mine tailings water samples containing approximately 125 mg/l dissolved copper, 200 mg/l WAD cyanide and a pH of 8.5-9.0 were placed in 250 ml beakers. Citric acid (410 mg/l) or other chelants for comparison were then dissolved in these solutions, during dissolution the pH was maintained at about 9.5 (+/−1) with 2M NaOH.

Hydrogen peroxide (50% w/w) was then added to the solutions with mixing, to provide approximately a 2:1 wt. ratio of $H_2O_2$:WAD CN (~430 mg/l $H_2O_2$). The reactions were allowed to commence with periodic agitation. Measurements of $H_2O_2$, pH and WAD cyanide ion (WAD CN) were taken over the course of the reaction. When the initial $H_2O_2$ was depleted or at approximately 30 minute intervals, 105 mg/l aliquots were added, with the total $H_2O_2$ dose not exceeding 640 mg/l (~3:1 wt. ratio $H_2O_2$:WAD CN). Results are provided in Table I.

COMPARATIVE EXAMPLE

The process of U.S. Pat. No. 3,617,567 was compared at 25° C. with the process of U.S. Pat. No. 4,417,987 with and without NTA as a chelant. Solutions were prepared containing 150 mg/l cyanide, 125 mg/l copper, 430 mg/l hydrogen peroxide. The cyanide concentration in the sample containing 500 mg/l NTA (pH 10.2-9.9) dropped to 0-10 mg/l within 30 minutes. The cyanide concentration in the sample without NTA (pH 11.6-11.4) dropped slowly to 70 mg/l in 30 minutes; 65-70 mg/l in 60 minutes and 25 mg/l in 210 minutes.

TABLE I

EFFECT OF CHELANT ON RATE OF WAD AND CYANIDE DESTRUCTION BY $H_2O_2$

| Chelant | | | mg/l WAD Cyanide Remaining After Minutes | | | | |
| --- | --- | --- | --- | --- | --- | --- | --- |
| Name | g. | mole ratio | 0 | 30 | 60 | 90 | 120 |
| NTA | 500 | 1.2:1 | 200 | 60 | 40 | 0-5* | 0-5 |
| EDTA | 920 | 1.2:1 | 200 | 90 | 75 | 50* | 50 |
| Citric Acid | 410 | 1.0:1 | 200 | 50 | 50 | 30 | 5-10* |

Conditions:
640 mg/l $H_2O_2$ was added (total)
430 mg/l at time 0
105 mg/l after 30 minutes and after 60 minutes
Initial WAD cyanide conc. = ~200 ppm
Cu conc. = ~125 ppm
Solution pH maintained at 9.5 (+/−1) with NaOH
Temp. ~25° C.

*Total $H_2O_2$ dose depleted

We claim:

1. A process for detoxifying an aqueous solution containing weak acid dissociable cyanide complexes of metals, the process comprising incorporating hydrogen peroxide and citric acid or a soluble salt thereof into the aqueous solution and maintaining the aqueous solution between pH 8 and pH 12 for a sufficient time to oxidize at least part of the cyanide contained therein, the hydrogen peroxide being provided in an amount sufficient to maintain a concentration of at least 1 millimole per liter of the aqueous solution, and the citric acid being provided in an amount to complex substantially all of the metal in the cyanide complexes.

2. The process of claim 1 wherein between one and two moles of citric acid are incorporated per mole of complexed metal ion in the solution.

3. The process of claim 1 wherein the aqueous solution is maintained between pH 9 and pH 10.

4. The process of claim 2 wherein the aqueous solution is maintained between pH 9 and pH 10.

* * * * *